(12) United States Patent
Shuler et al.

(10) Patent No.: US 8,093,308 B2
(45) Date of Patent: Jan. 10, 2012

(54) STYRENIC POLYMER COMPOSITIONS AND METHODS OF MAKING AND USING SAME

(75) Inventors: Joe Shuler, League City, TX (US); Jose Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 421 days.

(21) Appl. No.: 12/363,418

(22) Filed: Jan. 30, 2009

(65) Prior Publication Data

US 2010/0197819 A1 Aug. 5, 2010

(51) Int. Cl.
*C08J 9/02* (2006.01)
*C08K 5/00* (2006.01)
*C08F 297/00* (2006.01)
*C08L 25/04* (2006.01)

(52) U.S. Cl. ............ 521/98; 521/82; 521/146; 524/399; 524/451; 524/577

(58) Field of Classification Search .................. 521/98, 521/82, 146; 524/399, 451, 577
See application file for complete search history.

(56) References Cited

U.S. PATENT DOCUMENTS

| | | |
|---|---|---|
| 3,216,789 A | 11/1965 | Breck et al. |
| 4,221,905 A | 9/1980 | Tokas |
| 4,252,764 A | 2/1981 | Tokas |
| 4,274,984 A | 6/1981 | Tokas |
| 4,404,300 A | 9/1983 | Koski et al. |
| 4,433,099 A | 2/1984 | Kupper et al. |
| 4,777,210 A | 10/1988 | Sosa et al. |
| 4,861,127 A | 8/1989 | Failes |
| 4,934,433 A | 6/1990 | Aboul-Nasr |
| 5,006,566 A | 4/1991 | Weber et al. |
| 5,185,400 A | 2/1993 | Farrar, Jr. et al. |
| 5,442,041 A | 8/1995 | Mallikarjun et al. |
| 5,540,813 A | 7/1996 | Sosa et al. |
| 5,559,162 A | 9/1996 | Meijer et al. |
| 5,587,438 A | 12/1996 | Binsbergen et al. |
| 5,691,445 A | 11/1997 | Krupinski et al. |
| 6,156,842 A | 12/2000 | Hoenig et al. |
| 6,194,541 B1 | 2/2001 | Tirtowidjojo et al. |
| 6,211,331 B1 | 4/2001 | Craig |
| 6,348,636 B1 | 2/2002 | Racz |
| 6,355,697 B2 | 3/2002 | Schwarz |
| 6,387,968 B1 | 5/2002 | Glück et al. |
| 6,822,046 B2 | 11/2004 | Li et al. |
| 7,179,873 B2 | 2/2007 | Reimers et al. |
| 2001/0049418 A1* | 12/2001 | Krupinski et al. ............ 525/263 |
| 2002/0156184 A1* | 10/2002 | Krupinski et al. ............ 525/70 |
| 2003/0073792 A1 | 4/2003 | Moore |
| 2003/0088010 A1 | 5/2003 | Senninger |
| 2006/0189757 A1 | 8/2006 | Reimers |
| 2008/0188607 A1 | 8/2008 | Guerrieri et al. |
| 2010/0029824 A1* | 2/2010 | Steigelmann et al. ......... 524/443 |
| 2010/0113707 A1* | 5/2010 | Roussel et al. ............... 525/342 |

* cited by examiner

*Primary Examiner* — Timothy J. Kugel

(57) ABSTRACT

A method comprising contacting a first styrenic polymer composition comprising residual styrene monomer with a molecular sieve, and recovering a second styrenic polymer composition comprising a reduced amount of residual styrene monomer. A composition comprising a styrenic polymer having a residual styrene monomer amount of less than 100 ppm produced by contacting a styrenic polymer composition having a residual styrene monomer amount of equal to or greater than 100 ppm with a molecular sieve, and recovering the styrenic polymer having a residual styrene monomer amount of less than 100 ppm. A method comprising providing a styrenic polymer composition having a residual styrene monomer amount of equal to or greater than 100 ppm, contacting the styrenic polymer composition with a molecular sieve, adding a nucleating agent, a foaming agent, and a coloring agent to the styrenic polymer composition, and forming an expanded styrenic polymer composition having a residual styrene monomer amount of less than 100 ppm.

18 Claims, No Drawings

STYRENIC POLYMER COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

This disclosure relates to styrenic polymer compositions. More specifically, this disclosure relates to styrenic polymer compositions comprising a reduced amount of residual styrene monomer and methods of making and using same.

2. Background

Synthetic polymer materials are widely used in the manufacturing of a variety of end-use articles ranging from medical devices to food containers. Copolymers of monovinylidene aromatic compounds such as styrene, alpha-methylstyrene, and ring-substituted styrene comprise some of the most widely used thermoplastic elastomers. For example, styrenic copolymers can be useful for a range of end-use applications including disposable medical products, pharmaceutical products, food packaging, cosmetic products, tubing, and point-of-purchase displays. The styrenic polymer may also contain some amount of unreacted styrene monomer.

The amount of unreacted styrene monomer present may negatively impact downstream processing and/or affect the utility of the styrenic polymer composition. Thus, an ongoing need exists for compositions and methodologies for the production of styrenic polymer compositions having a reduced amount of residual styrene monomer.

SUMMARY

Disclosed herein is a method comprising contacting a first styrenic polymer composition comprising residual styrene monomer with a molecular sieve, and recovering a second styrenic polymer composition comprising a reduced amount of residual styrene monomer.

Also disclosed herein is a composition comprising a styrenic polymer having a residual styrene monomer amount of less than 100 ppm produced by contacting a styrenic polymer composition having a residual styrene monomer amount of equal to or greater than 100 ppm with a molecular sieve, and recovering the styrenic polymer having a residual styrene monomer amount of less than 100 ppm.

Further disclosed herein is a method comprising providing a styrenic polymer composition having a residual styrene monomer amount of equal to or greater than 100 ppm, contacting the styrenic polymer composition with a molecular sieve, adding a nucleating agent, a foaming agent, and a coloring agent to the styrenic polymer composition, and forming an expanded styrenic polymer composition having a residual styrene monomer amount of less than 100 ppm.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are styrenic polymer compositions having a reduced amount of residual styrene monomer (RRSCs), and methods of making and using same. In an embodiment, a method of preparing the RRSC comprises contacting a styrenic polymer composition (SPC) having residual styrene monomer present in an amount x with a molecular sieve and recovering an RRSC having residual styrene monomer present in an amount y wherein x is greater than y. The RRSC and methods of making and using same will be described in more detail later herein.

In an embodiment, the SPC is formed by the polymerization of styrene monomer and optionally one or more comonomers. Styrene, also known as vinyl benzene, cinnamene, ethyenylbenzene, and phenylethene is an organic compound represented by the chemical formula $C_8H_8$. Styrene is widely commercially available and as used herein the term styrene includes a variety of substituted styrenes (e.g., alpha-methyl styrene), ring-substituted styrenes such as p-methylstyrene, disubstituted styrenes such as p-t-butyl styrene as well as unsubstituted styrenes. In an embodiment, the SPC is present in the RRSC in an amount of from 1.0 weight percent (wt. %) to 99.9 wt. % by total weight of the RRSC, alternatively from 5 wt. % to 99 wt. %, alternatively from 10 wt. % to 95 wt. %. Alternatively, the SPC comprises the remainder of the RRSC once all the other components are accounted for.

In an embodiment, a SPC suitable for use in this disclosure may have a melt flow rate of from 1 g/10 min. to 40 g/10 min., alternatively from 1.5 g/10 min. to 20 g/10 min., alternatively from 2 g/10 min. to 15 g/10 min. as determined in accordance with ASTM D-1238; a falling dart impact of from 5 in-lb to 200 in-lb, alternatively from 50 in-lb to 180 in-lb, alternatively from 100 in-lb to 150 in-lb as determined in accordance with ASTM D-3029; an Izod impact of from 0.4 ft-lbs/in to 5 ft-lbs/in, alternatively from 1 ft-lbs/in to 4 ft-lbs/in, alternatively from 2 ft-lbs/in to 3.5 ft-lbs/in as determined in accordance with ASTM D-256; a tensile strength of from 2,000 psi to 10,000 psi, alternatively from 2,800 psi to 8,000 psi, alternatively from 3,000 psi to 5,000 psi as determined in accordance with ASTM D-638; a tensile modulus of from 100,000 psi to 500,000 psi, alternatively from 200,000 psi to 450,000 psi, alternatively from 250,000 psi to 380,000 psi as determined in accordance with ASTM D-638; an elongation of from 0.5% to 90%, alternatively from 5% to 70%, alternatively from 35% to 60% as determined in accordance with ASTM D-638; a flexural strength of from 3,000 psi to 15,000 psi, alternatively from 4,000 psi to 10,000 psi, alternatively from 6,000 psi to 9,000 psi as determined in accordance with ASTM D-790; a flexural modulus of from 200,000 psi to 500,000 psi, alternatively from 230,000 psi to 400,000 psi, alternatively from 250,000 psi to 350,000 psi as determined in accordance with ASTM D-790; an annealed heat distortion of from 180° F. to 215° F., alternatively from 185° F. to 210° F., alternatively from 190° F. to 205° F. as determined in accordance with ASTM D-648; and a Vicat softening of from 190° F. to 225° F., alternatively from 195° F. to 220° F., alternatively from 200° F. to 215° F. as determined in accordance with ASTM D-1525.

In an embodiment, the SPC may be a styrenic homopolymer, which is also referred to as a general purpose polystyrene (GPPS) or a crystal grade polystyrene. In an embodiment, a GPPS suitable for use in this disclosure may have a melt flow rate of from 1 g/10 min. to 40 g/10 min., alternatively from 1.5 g/10 min. to 20 g/10 min., alternatively from 1.6 g/10 min. to 15 g/10 min. as determined in accordance with ASTM D-1238; a tensile strength of from 5,000 psi to 8,500 psi, alternatively from 6,000 psi to 8,000 psi, alternatively from 6,200 psi to 7,700 psi as determined in accordance with ASTM D-638; a tensile modulus of from 400,000 psi to 500,000 psi, alternatively from 420,000 psi to 450,000 psi, as determined in accordance with ASTM D-638; an elongation of from 0% to 2.0%, as determined in accordance with ASTM D-638; a flexural strength of from 10,000 psi to 15,000 psi, alternatively from 11,000 psi to 14,500 psi, alternatively from 11,500 psi to 14,200 psi as determined in accordance with ASTM D-790; a flexural modulus of from 400,000 psi to 500,000 psi, alternatively from 430,000 psi to 480,000 psi, as determined in accordance with ASTM D-790; an annealed heat distortion of from 185° F. to 220° F., alternatively from 190° F. to 215° F., alternatively from 195° F. to 212° F. as determined in accordance with ASTM D-648; and a Vicat softening of from 195° F. to 230° F., alternatively from 200° F. to 228° F., alternatively from 205° F. to 225° F. as determined in accordance with ASTM D-1525.

An example of a GPPS suitable for use in this disclosure includes without limitation 523 W, which is a crystal grade polystyrene commercially available from Total Petrochemicals USA, Inc. In an embodiment, the SPC (e.g., 523 W) has generally the physical properties set forth in Table 1.

TABLE 1

| Properties | 523W Typical Value | Test Method |
|---|---|---|
| Melt flow rate (MFR), g/10 min. at 200° C., 5 kg | 11.0 | ASTM D-1238 |
| Tensile properties | | |
| Tensile strength, psi | 6,500 | ASTM D-638 |
| Tensile modulus, psi ($10^5$) | 4.4 | ASTM D-638 |
| Flexural properties | | |
| Flexural strength, psi | 11,900 | ASTM D-790 |
| Flexural modulus, psi ($10^5$) | 4.8 | ASTM D-790 |
| Thermal properties | | |
| Heat distortion temperature - annealed, ° F. | 204 | ASTM D-648 |
| Vicat softening, ° F. | 222 | ASTM D-1525 |
| Other properties | | |
| Density (g/cm$^3$) | 1.04 | ASTM D-792 |
| Linear Shrinkage (in/in) | 0.004-0.007 | ASTM D-955 |
| Moisture (%) | <0.1 | ASTM D-570 |

In some embodiments, the SPC comprises styrene and one or more comonomers. Examples of comonomers suitable for use in this disclosure include without limitation α-methylstyrene; halogenated styrenes; alkylated styrenes; acrylonitrile; esters of (meth)acrylic acid with alcohols having from 1 to 8 carbons; N-vinyl compounds such as vinylcarbazole, maleic anhydride; compounds which contain two polymerizable double bonds such as divinylbenzene or butanediol diacrylate; or combinations thereof. The comonomer may be present in an amount effective to impart one or more user-desired properties to the composition. Such effective amounts may be determined by one of ordinary skill in the art with the aid of this disclosure. For example, the comonomer may be present in the styrenic polymer composition in an amount of from 1 wt. % to 99.9 wt. % by total weight of the reaction mixture, alternatively from 1 wt. % to 90 wt. %, alternatively from 1 wt. % to 50 wt. %.

In some embodiments, the SPC may be an impact polystyrene or a high impact polystyrene (HIPS) that further comprises an elastomeric material. Such HIPS may contain an elastomeric phase that is embedded in the polystyrene matrix resulting in the composition having an increased impact resistance.

In an embodiment, the SPC is a HIPS comprising a conjugated diene monomer as the elastomer. Examples of suitable conjugated diene monomers include without limitation 1,3-butadiene, 2-methyl-1,3-butadiene, 2-chloro-1,3 butadiene, 2-methyl-1,3-butadiene, and 2-chloro-1,3-butadiene. Alternatively, the HIPS comprises an aliphatic conjugated diene monomer as the elastomer. Without limitation, examples of suitable aliphatic conjugated diene monomers include $C_4$ to $C_9$ dienes such as butadiene monomers. Blends or copolymers of the diene monomers may also be used. Likewise, mixtures or blends of one or more elastomers may be used. In an embodiment, the elastomer comprises a homopolymer of a diene monomer, alternatively, the elastomer comprises polybutadiene. The elastomer may be present in the HIPS in amounts effective to produce one or more user-desired properties. Such effective amounts may be determined by one of ordinary skill in the art with the aid of this disclosure. For example, the elastomer may be present in the HIPS in an amount of from 1 wt. % to 20 wt. %, alternatively from 2 wt. % to 15 wt. %, alternatively 5 wt. % to 11 wt. % based on the total weight of the HIPS.

In an embodiment, a HIPS suitable for use in this disclosure may have a melt flow rate of from 1 g/10 min. to 40 g/10 min., alternatively from 1.5 g/10 min. to 20 g/10 min., alternatively from 2 g/10 min. to 15 g/10 min. as determined in accordance with ASTM D-1238; a falling dart impact of from 5 in-lb to 200 in-lb, alternatively from 50 in-lb to 180 in-lb, alternatively from 100 in-lb to 150 in-lb as determined in accordance with ASTM D-3029; an Izod impact of from 0.4 ft-lbs/in to 5 ft-lbs/in, alternatively from 1 ft-lbs/in to 4 ft-lbs/in, alternatively from 2 ft-lbs/in to 3.5 ft-lbs/in as determined in accordance with ASTM D-256; a tensile strength of from 2,000 psi to 10,000 psi, alternatively from 2,800 psi to 8,000 psi, alternatively from 3,000 psi to 5,000 psi as determined in accordance with ASTM D-638; a tensile modulus of from 100,000 psi to 500,000 psi, alternatively from 200,000 psi to 450,000 psi, alternatively from 250,000 psi to 380,000 psi as determined in accordance with ASTM D-638; an elongation of from 0.5% to 90%, alternatively from 5% to 70%, alternatively from 35% to 60% as determined in accordance with ASTM D-638; a flexural strength of from 3,000 psi to 15,000 psi, alternatively from 4,000 psi to 10,000 psi, alternatively from 6,000 psi to 9,000 psi as determined in accordance with ASTM D-790; a flexural modulus of from 200,000 psi to 500,000 psi, alternatively from 230,000 psi to 400,000 psi, alternatively from 250,000 psi to 350,000 psi as determined in accordance with ASTM D-790; an annealed heat distortion of from 180° F. to 215° F., alternatively from 185° F. to 210° F., alternatively from 190° F. to 205° F. as determined in accordance with ASTM D-648; a Vicat softening of from 195° F. to 225° F., alternatively from 195° F. to 220° F., alternatively from 200° F. to 215° F. as determined in accordance with ASTM D-1525; and a gloss 60° of from 30 to 100, alternatively from 40 to 98, alternatively from 50 to 95 as determined in accordance with ASTM D-523.

An example of a HIPS suitable for use in this disclosure includes without limitation 945E, which is a high impact polystyrene commercially available from Total Petrochemicals USA, Inc. In an embodiment, the HIPS (e.g., 945E) has generally the physical properties set forth in Table 2.

TABLE 2

| Properties | 945E Typical Value | Test Method |
|---|---|---|
| Melt flow rate (MFR), g/10 min. at 200° C., 5 kg | 3.5 | ASTM D-1238 |
| Tensile properties | | |
| Tensile strength, psi | 3,500 | ASTM D-638 |
| Tensile modulus, psi ($10^5$) | 3.0 | ASTM D-638 |
| Elongation (%) | 55 | ASTM D-638 |
| Flexural properties | | |
| Flexural strength, psi | 6,300 | ASTM D-790 |
| Flexural modulus, psi ($10^5$) | 3.1 | ASTM D-790 |
| Thermal properties | | |
| Heat distortion temperature - annealed, ° F. | 196 | ASTM D-648 |
| Vicat softening, ° F. | 208 | ASTM D-1525 |
| Impact properties | | |
| Falling dart (in-lb) | 160 | ASTM D-3029 |
| Izod - notched (ft-lbs/in) | 3.2 | ASTM D-256 |
| Other properties | | |
| Gloss 60° | 90 | ASTM D-523 |
| Density (g/cm$^3$) | 1.04 | ASTM D-792 |
| Linear Shrinkage (in/in) | 0.004-0.007 | ASTM D-955 |
| Moisture (%) | <0.1 | ASTM D-570 |

In an embodiment, the SPC optionally comprises a nucleating agent. A nucleating agent is a compound that increases the rate of crystallization of a polymer or provides a site for bubble formation, as in the foaming of polymers with different blowing agents. An example of a nucleating agent includes without limitation zinc stearate, talc, or combinations thereof. In an embodiment, the nucleating agent may be present in the SPC in an amount of from 0.1 wt. % to 6 wt. % based on the total weight of the SPC, alternatively from 0.5 wt. % to 5 wt. %, alternatively from 1 wt. % to 4 wt. %.

In an embodiment, the SPC optionally comprises a foaming agent. The foaming agent may be any foaming agent compatible with the other components of the SPC such as for example physical foaming agents, chemical foaming agents, and the like. Physical foaming agents are typically nonflammable gases that are able to evacuate the composition quickly leaving voids in the composition. Chemical foaming agents are chemical compounds that decompose endothermically at elevated temperatures. Decomposition of the chemical foaming agents generates gases that become entrained in the SPC, thus leading to the formation of voids within the SPC. Examples of foaming agents suitable for use in this disclosure include without limitation pentane, isopentane carbon dioxide, nitrogen, water vapor, propane, n-butane, isobutane, n-pentane, 2,3-dimethylpropane, 1-pentene, cyclopentene, n-hexane, 2-methylpentane, 3-methylpentane, 2,3-dimethylbutane, 1-hexene, cyclohexane, n-heptane, 2-methylhexane, 2,2-dimethylpentane, 2,3-dimethylpentane, or combinations thereof. In an embodiment, the foaming agent comprises isopentane.

In an embodiment, the foaming agent may be incorporated into the SPC in an amount of from 0.1 wt. % to 8 wt. %, alternatively from 1 wt. % to 6 wt. %, alternatively from 1.5 wt. % to 3.5 wt. % wherein the weight percent is based on the total weight of the SPC used to produce a foamed polymer.

In an embodiment, the SPC comprises one or more additives as deemed necessary to impart desired physical properties such as color. Examples of additives include without limitation stabilizers, chain transfer agents, antioxidants, UV stabilizers, lubricants, plasticizers, ultra-violet screening agents, oxidants, anti-oxidants, anti-static agents, ultraviolet light absorbents, fire retardants, processing oils, mold release agents, fillers, pigments/dyes, coloring agents, and the like. In an embodiment, the SPC comprises a coloring agent. An example of suitable coloring agent includes without limitation carbon black. In such an embodiment, the coloring agent may be present in the SPC in an amount of from 1 wt. % to 6 wt. %, alternatively from 1.5 wt. % to 5 wt. %, alternatively from 2 wt. % to 4 wt. % based on the total weight of the SPC.

The aforementioned additives may be used either singularly or in combination to form various formulations of the composition. These additives may be included in amounts effective to impart the desired properties. Effective additive amounts and processes for inclusion of these additives to styrenic polymer compositions may be determined by one skilled in the art with the aid of this disclosure. For example, one or more additives may be added during extrusion of the SPC and/or the RRSC, as described later herein. In an embodiment, one or more additives may be present in the SPC in an amount of from 0.01 wt. % to 10 wt. % based on the total weight of the SPC, alternatively from 0.1 wt. % to 8 wt. %, alternatively from 1 wt. % to 6 wt. %.

In an embodiment, a method for the production of the SPC comprises contacting the styrenic monomer, and optionally one or more comonomers, with at least one initiator. Any initiator capable of free radical formation that facilitates the polymerization of styrene may be employed. Such initiators include by way of example and without limitation organic peroxides. Examples of organic peroxides useful for polymerization initiation include without limitation diacyl peroxides, peroxydicarbonates, monoperoxycarbonates, peroxyketals, peroxyesters, dialkyl peroxides, hydroperoxides, or combinations thereof. In an embodiment, the initiator level in the reaction mixture is given in terms of the active oxygen in parts per million (ppm). For example, the level of active oxygen level in the disclosed reactions for the production of the styrenic polymer is from 20 ppm to 80 ppm, alternatively from 20 ppm to 60 ppm, alternatively from 30 ppm to 60 ppm. As will be understood by one of ordinary skill in the art, the selection of initiator and effective amount will depend on numerous factors (e.g., temperature, reaction time) and can be chosen by one of ordinary skill in the art with the benefits of this disclosure to meet the desired needs of the process. Polymerization initiators and their effective amounts have been described in U.S. Pat. Nos. 6,822,046; 4,861,127; 5,559,162; 4,433,099, and 7,179,873, each of which is incorporated by reference herein in its entirety.

In an embodiment, the polymerization reaction to form the SPC may be carried out in a solution or mass polymerization process. Mass polymerization, also known as bulk polymerization refers to the polymerization of a monomer in the absence of any medium other than the monomer and a catalyst or polymerization initiator. Solution polymerization refers to a polymerization process in which the monomers and polymerization initiators are dissolved in a non-monomeric liquid solvent at the beginning of the polymerization reaction. The liquid is usually also a solvent for the resulting polymer or copolymer.

The polymerization process can be either batch or continuous. In an embodiment, the polymerization reaction may be carried out using a continuous production process in a polymerization apparatus comprising a single reactor or a plurality of reactors. For example, the styrenic polymer composition can be prepared using an upflow reactor. Reactors and conditions for the production of a polymer composition are disclosed in U.S. Pat. No. 4,777,210, which is incorporated by reference herein in its entirety.

The temperature ranges useful with the process of the present disclosure can be selected to be consistent with the operational characteristics of the equipment used to perform the polymerization. In one embodiment, the temperature range for the polymerization can be from 90° C. to 240° C. In another embodiment, the temperature range for the polymerization can be from 100° C. to 180° C. In yet another embodiment, the polymerization reaction may be carried out in a plurality of reactors with each reactor having an optimum temperature range. For example, the polymerization reaction may be carried out in a reactor system employing a first and second polymerization reactors that are either continuously stirred tank reactors (CSTR) or plug-flow reactors. In an embodiment, a polymerization reactor for the production of a styrenic copolymer of the type disclosed herein comprising a plurality of reactors may have the first reactor (e.g., a CSTR), also known as the prepolymerization reactor, operated in the temperature range of from 90° C. to 135° C. while the second reactor (e.g. CSTR or plug flow) may be operated in the range of from 100° C. to 165° C.

The polymerized product effluent from the first reactor may be referred to herein as the prepolymer. When the prepolymer reaches the desired conversion, it may be passed through a heating device into a second reactor for further polymerization. The polymerized product effluent from the second reactor may be further processed and described in detail in the literature. Upon completion of the polymerization reaction, a styrenic polymer is recovered and subsequently processed, for example devolatized, pelletized, etc. The resulting SPC comprises residual styrene monomer in an amount of greater than 100 ppm.

In an embodiment, a method of preparing an RRSC of the type disclosed herein comprises contacting a SPC with a molecular sieve under conditions suitable for the molecular sieve to reduce the amount of residual styrene monomer.

Molecular sieves are porous materials that have an ability to undergo dehydration with little or no change in their crystal structure, thereby offering a high surface area for adsorption of molecules. In an embodiment, the molecular sieve comprises a zeolite. Zeolites are hydrated, crystalline metal aluminosilicates. Zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms is equal to 2. The framework exhibits a negative electrovalence that typically is balanced by the inclusion of cations within the crystal such as metals, alkali metals, alkaline earth metals, or hydrogen. Thus, zeolites are a group of natural or synthetic hydrated aluminosilicate minerals that contain alkali and alkaline metals. Zeolites are characterized by a framework structure that encloses interconnected cavities occupied by ion-exchangeable large metal cations such as potassium and water molecules permitting reversible dehydration. The actual formula of the zeolite may vary without changing the crystalline structure. In an embodiment, the molar ratio of silicon to aluminum (Si/Al) in the zeolite may vary from 1.0 to 3.5.

In an embodiment, the zeolite is a large-pore zeolite. The term "large-pore zeolite" as used herein refers to a zeolite having an effective pore diameter of from 6 Angstroms (Å) to 15 Å, alternatively from 7 Å to 9 Å. Large pore crystalline zeolites suitable for use in this disclosure include without limitation L-zeolite, X-zeolite, Y-zeolite, omega zeolite, beta zeolite, ZSM-4, ZSM-5, ZSM-10, ZSM-12, ZSM-20, REY, USY, RE-USY, LZ-210, LZ-210-A, LZ-210-M, LZ-210-T, SSZ-24, ZZA-26, SSZ-31, SSZ-33, SSZ-35, SSZ-37, SSZ-41, SSZ-42, SSZ-44, MCM-58, mordenite, faujasite, or combinations thereof. In an embodiment, the large pore zeolite has an isotypic framework structure such as for example L-zeolite.

Typical L-type zeolites contain mole ratios of oxides in accordance with the following formula:

$$M_{2/n}O.Al_2O_3.xSiO_2.yH_2O$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite. L-zeolite, its X-ray diffraction pattern, its properties, and methods for its preparation are described in detail in, U.S. Pat. No. 3,216,789, which is incorporated by reference herein in its entirety.

Examples of zeolites suitable for use in this disclosure include without limitation ABSCENTS 1000, ABSCENTS 2000, and ABSCENTS 3000, which are deodorizing powders commercially available from UOP. In an embodiment, the zeolite (e.g., ABSCENTS 1000) has generally the physical properties set forth in Table 3.

TABLE 3

| Properties | ABSCENTS 1000 |
|---|---|
| Chemical Formula | $Mx (AlO_2)x(SiO_2)y \cdot zH_2O$ |
| Product form | White powder |
| Particle size (microns, average) | <10 |
| Hunter color (L) | >94 |

The SPC may be of the type described previously herein. The contacting may be carried out by compounding or extrusion. For example, the SPC and the molecular sieve may be fed into an extruder to form a melted composition. In some embodiments, a nucleating agent, a foaming agent, a coloring agent, or combinations thereof, all of the type described herein previously may be added to the melted composition. Alternatively, the SPC may be contacted with a nucleating agent, a foaming agent, a coloring agent, or combinations thereof prior to introduction of the SPC and the molecular sieve to the extruder (e.g., via bulk mixing), during the introduction of the SPC and the molecular sieve to an extruder, or combinations thereof. In such embodiments, the resulting composition may be a foamed RRSC (also referred to as an expanded polystyrene or EPS). Methods for preparing a foamed polymer composition are described in U.S. Pat. Nos. 5,006,566 and 6,387,968, each of which is incorporated by reference herein in its entirety.

In an embodiment, the extrusion may be carried out at an extruder temperature of from 175° C. to 260° C., alternatively from 190° C. to 240° C., alternatively from 200° C. to 235° C. residence time of the extruder may range from 10 sec. to 60 sec., alternatively from 15 sec. to 50 sec., alternatively from 20 sec. to 40 sec. The extruder speed may also range from 50 rpm to 200 rpm, alternatively from 75 rpm to 150 rpm, alternatively from 100 rpm to 125 rpm.

In an embodiment, the SPC may be contacted with the molecular sieve at a SPC: molecular sieve ratio of from 99.9:0.1 to 90:10, alternatively from 99:1 to 92:8, alternatively from 98:2 to 96:4. In some embodiments, the presence of additional components in the SPC may affect the ability of the molecular sieve to reduce the amount of residual styrene monomer. For example, a nucleating agent such as zinc stearate may compete for active sites on the molecular sieves and/or may occupy zeolite pore sites making such sites and pores less available for adsorption of residual styrene monomers. In such embodiments, the amount of molecular sieves may be adjusted by one of ordinary skill in the art with the aid of this disclosure to achieve a desired reduction of the residual styrene monomer in the SPC. For example, the amounts of molecular sieves and a nucleating agent (e.g., zinc stearate) added to an SPC to achieve a desired reduction of the residual monomer in the SPC may be 3:2 molecular seive:nucleating agent, alternatively 2:3. In an embodiment, the amount of molecular sieve contacted with the SPC is in excess of the amount of nucleating agent present.

The resulting RRSCs (or foamed RRSC) may have a reduced amount of residual styrene monomer when compared to the SPC prior to contact with the molecular seive. Residual amounts of volatile hydrocarbons such as residual styrene monomer in RRSCs (or foamed RRSCs) may be determined by any suitable technique. For example the amount of residual styrene monomer may be determined by gas chromatography (GC). GC analysis of the amount of residual styrene monomer may be performed as will be described in more detail later herein.

In an embodiment, the RRSC may have residual styrene monomer present in an amount of less than 100 ppm, 95, 90, 85, 80, 75, 70, 65, 60, 55, 50, 45, 40, 35, 30, 25, 20, or 10 ppm.

The resulting RRSCs (or foamed RRSCs) may further comprise without limitation ethylbenzene, xylene, oligomers, and the like. Ethylbenzene with the formula $C_6H_5CH_2CH_3$ is an aromatic hydrocarbon that is an intermediate in the production of styrene monomer. In an embodiment, the RRSCs (or foamed RRSC) may comprise ethylbenzene in an amount of from 0 ppm to 250 ppm, alternatively from 25 ppm to 200 ppm, alternatively from 50 ppm to 100 ppm.

Xylene is a generic term for a group of three benzene derivatives which encompasses ortho-, meta-, and para-isomers of dimethyl benzene. The o-, m- and p-designations specify to which carbon atoms (of the benzene ring) the two methyl groups are attached. Counting the carbon atoms from one of the ring carbons bonded to a methyl group, and counting towards the second ring carbon bonded to a methyl group, the o-isomer has the IUPAC name of 1,2-dimethylbenzene, the m-isomer has the IUPAC name of 1,3-dimethylbenzene, and the p-isomer has the IUPAC name of 1,4-dimethylbenzene. Xylene is used as a solvent and in the printing, rubber, and leather industries. p-Xylene is used as a feedstock in the production of terephthalic acid, which is a monomer used in the production of polymers. It is also used as a cleaning agent for steel and for silicon wafers and chips, a pesticide, a thinner for paint, and in paints and varnishes. It may be substituted for toluene to thin lacquers where slower drying is desired. In an embodiment, the RRSCs (or foamed RRSC) may comprise xylene in an amount of from 0 ppm to 200 ppm, alternatively from 5 ppm to 150 ppm, alternatively from 10 ppm to 100 ppm.

An oligomer consists of a limited number of monomer units which is in contrast to a polymer which, at least in principle, consists of an unbounded number of monomers. Unlike a polymer, if one of the monomers is removed from an oligomer, its chemical properties are altered. Herein, oligomers may be present in the RRSC. In an embodiment, the oligomers are in the form of dimers and/or trimers of styrene (dimers/trimers). In an embodiment, the RRSCs (or foamed RRSC) may comprise dimer/trimers in an amount of from 0 ppm to 15,000 ppm, alternatively from 100 ppm to 12,000 ppm, alternatively from 500 ppm to 10,000 ppm.

The RRSCs of this disclosure may be converted to a variety end-use articles as would be known to one of ordinary skill in the art with the aid of this disclosure. Examples of end use articles into which the RRSCs of this disclosure may be formed include food packaging, office supplies, plastic lumber, replacement lumber, patio decking, structural supports, laminate flooring compositions, polymer foam substrate, decorative surfaces (e.g., crown molding, etc.), weatherable outdoor materials, point-of-purchase signs and displays, housewares and consumer goods, building insulation, cosmetics packaging, outdoor replacement materials, lids and containers (i.e., for deli, fruit, candies and cookies), appliances, utensils, electronic parts, automotive parts, enclosures, protective head gear, reusable paintballs, toys (e.g., LEGO bricks), musical instruments, golf club heads, piping, business machines and telephone components, shower heads, door handles, faucet handles, wheel covers, automotive front grilles, and so forth.

EXAMPLES

The disclosure having been generally described, the following examples are given as particular embodiments of the disclosure and to demonstrate the practice and advantages thereof. It is understood that the examples are given by way of illustration and are not intended to limit the specification or the claims to follow in any manner.

Example 1

The ability of a molecular sieve (e.g., zeolite) to reduce the amount of residual styrene monomer in an SPC was investigated. Four samples, designated Samples 1-4, were prepared. The zeolite used was ABSCENTS 1000, which is available from UOP and the SPC was 523W, which is a crystal grade polystyrene having a residual styrene amount of 340 ppm commercially available from Total Petrochemicals. Each sample contained 523W as the base resin, Samples 2-4 additionally contained 1 wt. % of ABSCENTS 1000. The samples were fed into and extruded using a commercially available benchtop extruder at an extrusion temperature of 200° C. and a residence time of 0, 1, 2, and 3 minutes for Samples 1, 2, 3, and 4 respectively. The resulting extrudates were analyzed for the amount of styrene, ethylbenzene, xylene, dimer/trimer, and other remaining materials by GC.

GC samples were prepared by first dissolving 4 grams of the RRSC in 10 microliters of pentadecane and 20 microliters of methylene chloride in a bottle. Next, the bottle was placed in a shaker to dissolve the RRSC. Methanol (25 µl) was added to the bottle to precipitate all polymers. The remaining liquid was then analyzed by GC for levels of residual styrene monomer, ethylbenzene, xylene, dimers/trimers. The peak area of each component was then compared to a response of a known amount of internal standard (e.g., pentadecane). The results are tabulated in Table 4.

TABLE 4

|  | Sample # | | | |
| --- | --- | --- | --- | --- |
|  | 1 | 2 | 3 | 4 |
| 523W (wt. %) | 100 | 99 | 99 | 99 |
| ABSCENTS 1000 Loading (wt. %) | 0 | 1 | 1 | 1 |
| Residence Time (min) | 0 | 1 | 2 | 3 |
| Extruder Temperature (° C.) | 200 | 200 | 200 | 200 |
| Styrene (wt. %) | 0.037 | 0.000 | 0.000 | 0.000 |
| Ethylbenzene (wt. %) | 0.010 | 0.067 | 0.062 | 0.053 |
| Xylene (wt. %) | 0.001 | 0.001 | 0.001 | 0.000 |
| Dimer/Trimer (wt. %) | 1.185 | 0.117 | 0.061 | 0.075 |
| Others (wt. %) | 0.067 | 0.452 | 0.482 | 0.499 |

The results demonstrated that at 1 wt. % of ABSCENTS 1000, the amount of residual styrene monomer present in Samples 2-4 were reduced to below the GC detection limit of 10 ppm. The reduction of residual styrene monomer appeared to be independent of extruder residence time.

The amount of ethylbenzene, xylene, dimer/trimer, and other remaining material was found to vary with the residence times. The amounts of ethylbenzene increased for the samples having ABSCENTS 1000 (Samples 2-4) when compared to Sample 1. Without wishing to be limited by theory, styrene consumption and the ethylbenzene formation may be a result of cationic polymerization of styrene monomer initiated by the acid sites of ABSCENTS 1000. Further, hydrogen transfer from a polystyrene chain to the secondary styrene carbocation may lead to the formation of ethylbenzene and a tertiary polystyrene carbocation. In addition, the color of extrudates of Samples 1-4 ranged from gray to black, which may be a result of a cationic polymerization with a fast transfer reaction to the polystyrene chain.

The amount of dimer/trimer remaining was reduced from greater than 1 wt. % (Sample 1) to 0.1 wt. % or less (Samples 2-4), which may be due to zeolite absorption of the dimer/trimer material. The amounts of other remaining materials were increased from less than 0.07 wt. % (Sample 1) to 0.5 wt. % (Samples 2-4).

Example 2

The effect of a nucleating agent on the ability of a zeolite to reduce residual styrene in a SPC was investigated. Eight samples, designated Samples 5-12, were prepared. Samples 5-10 comprised 4 wt. % zinc stearate and Samples 11-12 were control samples having no zinc stearate. The SPC used was 523W. The nucleating agent used was zinc stearate, which is widely commercially available. The zeolites used were ABSCENTS 1000 and ABSCENTS 2000, which are deodorizing powders commercially available from UOP. Carbon black was also used as a coloring agent in some samples as will be described later herein. The amounts of 523W, ABSCENTS 1000, ABSCENTS 2000, zinc stearate, and carbon black for each sample are tabulated in Table 5. All samples were extruded using a DSM benchtop twin-screw extruder. The DSM extruder screw speed was 100 rpm, the temperature was 200° C., and the residence time was 2 minutes. The resulting extrudates were analyzed by GC as described in Example 1 in order to determine the percentage amounts of styrene, ethylbenzene, xylene, dimer/trimer, and other remaining materials. The results are tabulated in Table 5.

The results demonstrate that zinc stearate competed with residual styrene for active sites on the zeolites as shown by the increased presence of styrene in the extrudates of Samples 5-10 in amounts ranging from 0 to 0.033 wt. % when compared to Samples 11 and 12 which did not have zinc stearate. The samples having zinc stearate (Samples 5-10) also had a slight tan color when compared to the gray to black colors of the control samples which did not contain zinc stearate (Samples 11-12). The presence of carbon black did not seem to affect the zeolite's ability to reduce residual styrene monomer in the SPC. ABSCENTS 1000 was able to reduce the amount of residual styrene further than ABSCENTS 2000, as shown by comparing the ABSCENTS 1000 containing samples, Samples 6, 9, and 11 to the ABSCENTS 2000 containing samples, Samples 8, 10, and 12. Specifically the effect of the differing zeolites may be observed by comparing, Sample 6 (styrene=0.018 wt. %) vs. Sample 8 (styrene =0.032 wt. %), Sample 9 (styrene=0.006 wt. %) vs. Sample 10 (styrene=0.025 wt. %), and Sample 11 (styrene=0.000 wt. %) vs. Sample 12 (styrene=0.003 wt. %). In addition, zinc stearate seemed to reduce ethylbenzene conversion as shown by Samples 5-10 having less ethylbenzene when compared to Samples 11-12.

Example 3

The effects of zeolite amount and residence time on the reduction of residual styrene in an SPC were investigated. Three samples, designated Samples 13-15, were prepared. Samples 13-15 had 95 wt. % 523W, 3 wt. % ABSCENTS 1000, and 4 wt. % zinc stearate. The samples were fed into and extruded using a 1¼ in. single screw extruder at a temperature of 200° C. For Samples 13-15, the extruder speeds were 150, 100, and 75 rpm and the residence times were 14, 25, and 30 seconds respectively. The resulting extrudates were analyzed by GC as described in Example 1 in order to determine the percentage amounts of styrene, ethylbenzene, xylene, dimer/trimer, and other remaining materials. The results are tabulated in Table 6.

TABLE 6

| | Sample # | | |
|---|---|---|---|
| | 13 | 14 | 15 |
| 523W (wt. %) | 95.0 | 95.0 | 95.0 |
| ABSCENTS 1000 Loading (wt. %) | 3.0 | 3.0 | 3.0 |

TABLE 5

| | Sample # | | | | | | | |
|---|---|---|---|---|---|---|---|---|
| | 5 | 6 | 7 | 8 | 9 | 10 | 11 | 12 |
| 523W (wt. %) | 83.5 | 83.0 | 83.5 | 83.0 | 95.0 | 95.0 | 86.5 | 86.5 |
| ABSCENTS 1000 Loading (wt. %) | 0.5 | 1.0 | 0.5 | 0 | 1.0 | 0 | 1.03 | 0 |
| ABSCENTS 2000 Loading (wt. %) | 0 | 0 | 0 | 1.0 | 0 | 1.0 | 0 | 1.03 |
| Zinc Stearate (wt. %) | 4.0 | 4.0 | 4.0 | 4.0 | 4.0 | 4.0 | 0.0 | 0.0 |
| Carbon Black (wt. %) | 12.0 | 12.0 | 12.0 | 12.0 | 0.0 | 0.0 | 12.4 | 12.4 |
| DSM Extruder Screw Speed (rpm) | 100 | 100 | 100 | 100 | 100 | 100 | 100 | 100 |
| DSM Extruder Temperature (° C.) | 200 | 200 | 200 | 200 | 200 | 200 | 200 | 200 |
| DSM Extruder Residence Time (min) | 2.0 | 2.0 | 2.0 | 2.0 | 2.0 | 2.0 | 2.0 | 2.0 |
| Styrene (wt. %) | 0.022 | 0.018 | 0.033 | 0.032 | 0.006 | 0.025 | 0.000 | 0.003 |
| Ethylbenzene (wt. %) | 0.009 | 0.011 | 0.008 | 0.008 | 0.011 | 0.009 | 0.017 | 0.014 |
| Xylene (wt. %) | 0.001 | 0.001 | 0.001 | 0.001 | 0.001 | 0.001 | 0.001 | 0.001 |
| Dimer/Trimer (wt. %) | 1.091 | 1.068 | 1.036 | 1.203 | 1.173 | 1.171 | 1.104 | 0.987 |
| Others (wt. %) | 0.086 | 0.087 | 0.088 | 0.086 | 0.049 | 0.181 | 0.102 | 0.061 |

TABLE 6-continued

| | Sample # | | |
|---|---|---|---|
| | 13 | 14 | 15 |
| Zinc Stearate (wt. %) | 4.0 | 4.0 | 4.0 |
| 1¼ in. Extruder Screw Speed | 150 | 100 | 75 |
| 1¼ in. Extruder Temperature (° C.) | 200 | 200 | 200 |
| 1¼ in. Extruder Residence Time (sec) | 14 | 25 | 30 |
| Extrudate Appearance (color) | Light brown | Medium brown | Dark brown |
| Styrene (wt. %) | 0.017 | 0.008 | 0.003 |
| Ethylbenzene (wt. %) | 0.006 | 0.016 | 0.019 |
| Xylene (wt. %) | 0.001 | 0.001 | 0.001 |
| Dimer/Trimer (wt. %) | 0.824 | 1.045 | 1.237 |
| Others (wt. %) | 0.199 | 0.343 | 0.263 |

The results demonstrated that with increasing residence times from 14 s for Sample 13 to 30 s for Sample 15, the color intensified from a light brown to a dark brown. At a residence time of 30 seconds, 30 ppm of residual styrene was present in Sample 15. Sample 13 that was extruded at 150 rpm resulted in porous and brittle extrudates. Without wishing to be limited by theory, the porous and brittle extrudates of Sample 13 may be due to pre-foaming or over-foaming, which may be a result of excess nucleation. The combination of zinc stearate and zeolite appears to have a synergistic effect which resulted in foaming of the extrudates upon exit from the die. The resultant extrudates were porous in appearance but not expanded as would be expected with a blowing agent. The zeolite was added in excess over the zinc stearate concentration since the zinc stearate competed with styrene monomer for active sites on the zeolite. In comparison, at a slower extrusion rate, Sample 15 appeared solid. Interestingly in this example, extrusion using the 1¼ in. single screw extruder showed that residence time affected the residual styrene reduction.

Example 4

The effect of foaming agents on the ability of zeolite to reduce residual styrene in an SPC was investigated. The foaming agent used was isopentane. Two samples, designated Samples 16 and 17, were prepared. Sample 16 was prepared by mixing 523W having 340 ppm residual styrene monomer, 2% zinc stearate, and 3% ABSCENTS 1000. Sample 17 was prepared by first mixing 523 W, 2% zinc stearate, and 3% ABSCENTS 1000, feeding the mixture into an extruder, and melting the mixture in the extruder. Next, 5% isopentane was added halfway down the extruder. The melted mixture is then extruded through a die plate holes and the extrusion speed was adjusted to produce extrudates that appear solid instead of porous or brittle. The resulting extrudates were cut underwater resulting in small spherical beads (i.e., Sample 17). The resulting extrudates were analyzed by GC as described in Example 1 in order to determine the percentage amounts of styrene, ethylbenzene, xylene, dimer/trimer, and other remaining materials. The results are tabulated in Table 7.

TABLE 7

| | Sample # | |
|---|---|---|
| | 16 | 17 |
| Styrene (%) | 0.002 | 0.002 |
| Ethylbenzene (%) | 0.008 | 0.009 |
| Xylenes (%) | 0.000 | 0.000 |

TABLE 7-continued

| | Sample # | |
|---|---|---|
| | 16 | 17 |
| Dimer/Trimer (%) | 1.070 | 1.171 |
| Others (%) | 0.624 | 0.640 |

The results demonstrate that the amount of residual styrene monomer was reduced from 340 ppm to 20 ppm for both samples. The addition of isopentane foaming agent had no effect on the reduction of residual styrene monomer. In addition, there was only a small difference in the dimer/trimer percentage between Samples 16 and 17. The presence of zinc stearate seemed to inhibit production of dimer/trimer, as well as ethylbenzene.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
contacting a first styrenic polymer composition comprising residual styrene monomer with a molecular sieve, wherein the molecular sieve is selected from the group consisting of L-zeolite, X-zeolite, Y-zeolite, omega zeolite, beta zeolite, ZSM-4, ZSM-10, ZSM-12, ZSM-20, REY, USY, RE-USY, LZ-210, LZ-210-A, LZ-210-M, LZ-210-T, SSZ-24, ZZA-26, SSZ-31, SSZ-33, SSZ-35, SSZ-37, SSZ-41, SSZ-42, SSZ-44, MCM-58, mordenite, faujasite, and combinations thereof; and
recovering a second styrenic polymer composition comprising a reduced amount of residual styrene monomer.

2. The method of claim 1 further comprising contacting the first styrenic polymer with a nucleating agent, a foaming agent, a coloring agent, or combinations thereof.

3. The method of claim 2 wherein the nucleating agent comprises zinc stearate, talc, or combinations thereof.

4. The method of claim 3, wherein the nucleating agent is zinc stearate, and wherein the first styrenic polymer composition is contacted with the molecular sieve in a molecular sieve:nucleating agent ratio of from 3:2 to 2:3.

5. The method of claim 2 wherein the foaming agent comprises pentane, isopentane carbon dioxide, nitrogen, water vapor, propane, n-butane, isobutane, n-pentane, 2,3-dimethylpropane, 1-pentene, cyclopentene, n-hexane, 2-methylpentane, 3-methylpentane, 2,3-dimethylbutane, 1-hexene, cyclohexane, n-heptane, 2-methylhexane, 2,2-dimethylpentane, 2,3-dimethylpentane, or combinations thereof.

6. The method of claim 5 wherein after contacting the styrenic polymer with a foaming agent the foaming agent is present in the first styrenic polymer composition in an amount of from 0.1 wt. % to 8 wt. % based on the total weight of the first styrenic polymer composition.

7. The method of claim 2 wherein the coloring agent comprises carbon black.

8. The method of claim 7 wherein after contacting the styrenic polymer with a foaming agent the coloring agent is present in the first styrenic polymer composition in an amount of from 1 wt, % to 6 wt. % based on the total weight of the second styrenic polymer composition.

9. The method of claim 2 wherein, after contacting the styrenic polymer with a nucleating agent, the nucleating agent is present in the first styrenic polymer composition in an amount of from 0.1 wt. % to 6 wt. % based on the total weight of the first styrenic polymer composition.

10. An article produced from the second styrenic polymer composition of claim 1.

11. The article of claim 10 comprising a food packaging container.

12. The method of claim 1 wherein the first styrenic polymer composition comprises greater than 100 ppm residual styrene monomer and the second styrenic polymer composition comprises less than 100 ppm residual styrene monomer.

13. The method of claim 1 wherein the first styrenic polymer composition is contacted with the molecular sieve in a first styrenic polymer composition: molecular sieve ratio of from 99.9:0.1 to 90:10.

14. The method of claim 1 wherein the second styrenic polymer composition comprises ethylbenzene in an amount of from 25 ppm to 200 ppm based on the total weight of the second styrenic polymer composition.

15. The method of claim 1 wherein the second styrenic polymer composition comprises xylenes in an amount of from 5 ppm to 150 ppm based on the total weight of the second styrenic polymer composition.

16. The method of claim 1 wherein the second styrenic polymer composition comprises a dimer/trimer mixture of oligomers in an amount of from 100 ppm to 12,000 ppm based on the total weight of the second styrenic polymer composition.

17. The method of claim 1, wherein the molecular sieve is a large pore zeolite with an isotypic framework.

18. A method comprising:
contacting a first styrenic polymer composition comprising residual styrene monomer with a molecular sieve, wherein the molecular sieve is selected from the group consisting of L-zeolite, X-zeolite, Y-zeolite, omega zeolite, beta zeolite, ZSM-4, ZSM-10, ZSM-12, ZSM-20, REY, USY, RE-USY, LZ-210, LZ-210-A, LZ-210-M, LZ-210-T, SSZ-24, ZZA-26, SSZ-31, SSZ-33, SSZ-35, SSZ-37, SSZ-41, SSZ-42, SSZ-44, MCM-58, mordenite, faujasite, and combinations thereof;
extruding the first styrenic polymer to form a melted composition;
contacting the melted composition with a nucleating agent, a foaming agent, a coloring agent, or combinations thereof; and
recovering a second styrenic polymer composition comprising a reduced amount of residual styrene monomer.

* * * * *